Patented Jan. 25, 1949

2,459,897

UNITED STATES PATENT OFFICE 2,459,897

SILVER IMPREGNATION

George Schwarz, Williamstown, Mass.

No Drawing. Application July 25, 1945,
Serial No. 607,089

7 Claims. (Cl. 117—138.5)

This invention relates to new chemical compounds and to materials and preparations containing same. It also relates to the process of making such compounds, materials and preparations.

The invention is more particularly concerned with bactericidal substances containing highly dispersed colloidal silver processing outstanding bactericidal fungicidal, bacteriostatic and fungistatic properties.

In my copending application for patent of the United States, Serial No. 573,465, I have described the production of bactericidal materials by impregnating fibrous materials or colloidal inorganic substances with a compound containing colloidal highly reactive silver by reacting the impregnated material with an alcohol containing at least one basic nitrogen group and at least one hydroxyl group, such as for instance an amino alcohol.

I have since found that similar materials or preparations can be obtained by using as impregnating substance a solution containing silver ions, for instance a solution of silver nitrate, and a heterocyclic compound of the general formula

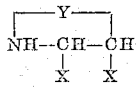

in which X is hydrogen or alkyl or alkylol, while Y represents atoms required to complete a ring structure.

Compounds answering this formula are for instance:

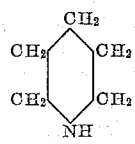
Piperidine (the hexahydropyridine)

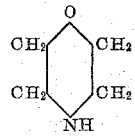
Morpholine

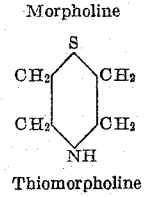
Thiomorpholine

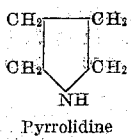
Pyrrolidine

In practicing my invention, I may for instance proceed as follows:

*Example 1.*—One kilogram cotton is soaked about 30 minutes in a solution of 10 grams silver nitrate and 10 grams piperidine in 20 liters water. The mixture is then heated to boiling temperature and kept boiling during 5 to 10 minutes. The impregnated cotton is then squeezed out or centrifuged, washed with water and dried. It contains highly dispersed colloidal silver of yellow color which does not stain. It can be used with great advantage in the manufacture of antiseptic bandages or as a bactericidal filtering material in the sterilization of drinking water, or for other purposes. The piperidine may be replaced by equimolar quantities of substituted piperidines, such as for instance, 2-, 3- or 4-pipecoline or 2-piperidine-ethanol or by morpholine, or thiomorpholine or by mixtures of two or more of these compounds. The silver nitrate may be replaced with equal effect by silver oxide or by any silver-amine-complex salt. The cotton may be replaced by wool, paper pulp, gauze or any other fabric.

*Example 2.*—A cotton fabric is soaked in an aqueous 5 per cent solution of silver nitrate, and is then exposed to the vapors of boiling morpholine, whereby colloidal silver is formed in the fabric in high dispersion, being firmly incorporated in the fibres. The fabric impregnated in this manner again contains highly dispersed colloidal silver of yellow color. It is highly resistant to the action of mildew and fungi and retains this faculty even after being exposed to rain or subjected to washing. In this example the morpholine may be replaced by thiomorpholine or piperidine or mixtures of same with water.

In contradistinction to all processes hitherto known for the production of oligodynamic silver preparations the process according to the present invention, if applied to organic fibres, yields a modification of colloidal silver of so high a degree of dispersion that a selective light absorption takes place in the short wave end of the visible spectrum. Thus the colloidal silver here produced is of yellow color, as contrasted with the metallic or gray modifications characteristic of preparations resulting in prior art processes.

Instead of impregnating cotton, wool or other fibers or fabrics, I say also impregnate with compounds as here described other large-surface materials such as charcoal, pumice, wood, sand, bristles and so on.

Various modifications may be made in the manner of proceeding described in this specification by way of example without departing from my invention or sacrificing the advantages thereof.

I claim:

1. The method of producing on a surface a deposit of highly dispersed colloidal silver, which consists in the steps of reducing, in contact with the surface on which the deposit is to be produced, an equeous solution of a silver compound providing silver ions, by reacting said solution with sufficient of a heterocyclic secondary amine to effect such reduction, said heterocyclic secondary amine being selected from the group consisting of piperidine, morpholine, thiomorpholine, pyrrolidine, there alkyl and alkylol substitution products, and mixtures thereof.

2. The process of claim 1, in which the reaction is effected with the heterocylic compound in the vapor phase.

3. The method in accordance with claim 1, in which said heterocyclic secondary amine is morpholine.

4. The method in accordance with claim 1, in which said heterocyclic secondary amine is piperidine.

5. The method in accordance with claim 1, in which said hyterocylic secondary amine is thiomorpholine.

6. The method of producing on organic fibers a relatively permanent deposit of yellow highly dispersed colloidal silver, which consists in the steps of reducing, in contact with the organic fibers on which the deposit is to be produced, an aqueous solution of a silver compound providing silver ions, by reacting said solution with sufficient of a heterocyclic secondary amine to effect such reduction, said heterocyclic secondary amine being selected from the group consisting of morpholine, piperidine, thiomorpholine, pyrrolidine, their alkyl and alkylol substitution products, and mixtures thereof.

7. As a new product, an organic fiber having thereon a relatively permanent water-insoluble stable yellow deposit of highly dispersed colloidal silver formed by reducing, in contact with said organic fiber, an aqueous solution of a silver compound providing silver ions, by reacting said solution with sufficient of a heterocyclic secondary amine to effect such reduction and deposit, said heterocyclic secondary amine being selected from the group consisting of morpholine, piperidine, thiomorpholine, pyrrolidine, their alkyl and alkylol substitution products, and mixtures thereof.

GEORGE SCHWARZ.

REFERENCES CITED

The following references are of record in the file of this patent:

UNITED STATES PATENTS

| Number | Name | Date |
| --- | --- | --- |
| 1,642,089 | Schreier | Sept. 13, 1927 |
| 1,989,764 | Meltsner et al. | Feb. 5, 1935 |
| 2,040,806 | Feigl | May 12, 1936 |
| 2,215,196 | Schlack | Sept. 17, 1940 |
| 2,247,339 | Robinson | June 24, 1941 |
| 2,283,883 | Conconi | May 19, 1942 |
| 2,315,141 | Tryon | Mar. 30, 1943 |

FOREIGN PATENTS

| Number | Country | Date |
| --- | --- | --- |
| 180,973 | Great Britain | Nov. 21, 1922 |